United States Patent [19]

Yamamoto

[11] 4,269,719

[45] May 26, 1981

[54] SLURRY DEHYDRATING APPARATUS

[76] Inventor: Morio Yamamoto, 2780-12 Haracho 2-chome, Suita-shi, Osaka, Japan

[21] Appl. No.: 65,942

[22] Filed: Aug. 13, 1979

[51] Int. Cl.³ .............................................. B01D 21/00
[52] U.S. Cl. .................... 210/803; 210/150; 210/522
[58] Field of Search .............. 210/150, 151, 319, 320, 210/322, 522, 71, 72, 76

[56] References Cited

U.S. PATENT DOCUMENTS

| | | | |
|---|---|---|---|
| 3,466,241 | 9/1969 | Simpson | 210/151 X |
| 3,516,929 | 6/1970 | Welch | 210/151 X |
| 3,705,099 | 12/1972 | Hunter | 210/322 X |
| 3,776,841 | 12/1973 | Torpey | 210/151 X |
| 3,997,443 | 12/1976 | Thissen | 210/150 |
| 4,010,102 | 3/1977 | Jarvstrat | 210/151 |
| 4,036,759 | 7/1977 | Donovan | 210/320 X |
| 4,044,696 | 8/1977 | Marincek | 210/71 |

Primary Examiner—John Adee
Attorney, Agent, or Firm—Merriam, Marshall & Bicknell

[57] ABSTRACT

This disclosure relates to apparatus for dehydrating or removing water from a liquid slurry such as sewage. The apparatus includes at least one vessel designed to receive a quantity of the slurry. At least one shaft is rotatably mounted above the vessel and has a plurality of spaced discs mounted on it. The lower part of each disc extends or dips into the slurry, and as the discs rotate a portion of the slurry adheres to the side surfaces of the discs. The water evaporates from the slurry on the portions of the discs that are exposed to the air. The concentrated slurry solids may be scraped from the sides of the discs and the solids settle to the bottom of the vessel. Means is provided at the bottom of the vessel for removing the solids.

10 Claims, 7 Drawing Figures

SLURRY DEHYDRATING APPARATUS

This invention relates to an apparatus for dehydrating or drying sewage, industrial waste liquid or other slurry.

It is an object of the invention to provide a compact apparatus for efficiently dehydrating a large amount of slurry in a relatively limited area.

The apparatus includes a vessel for containing a quantity of the slurry, a rotatable shaft extending across the open upper side of the vessel, and a number of discs mounted at regular intervals therealong to rotate with the shaft. The lower portions of the discs extend to the slurry, and a portion of the slurry adheres to the surfaces of the discs and is dried out as the rotating discs lift the slurry into the air.

Preferred embodiments of the invention will be described hereinafter by way of example with reference to the accompanying drawings.

Figure 1:
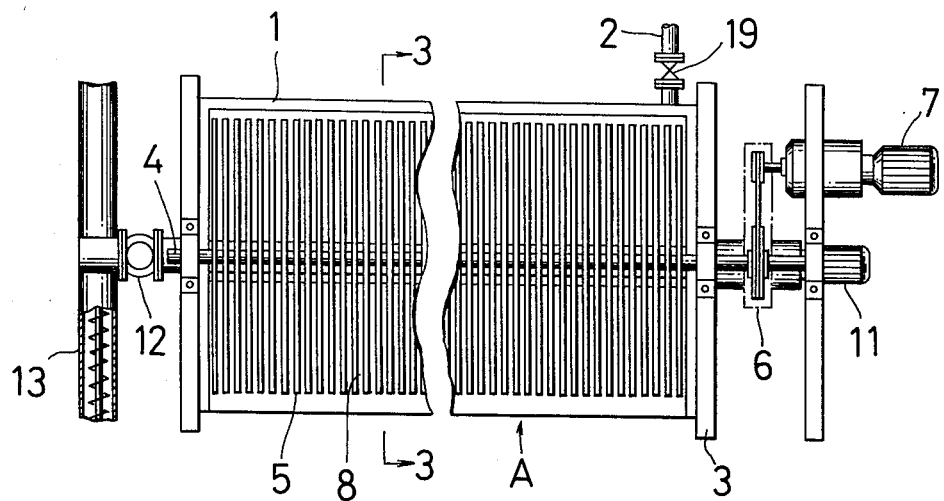
FIG. 1 is a plan view of a preferred form of the invention.
Figure 2:
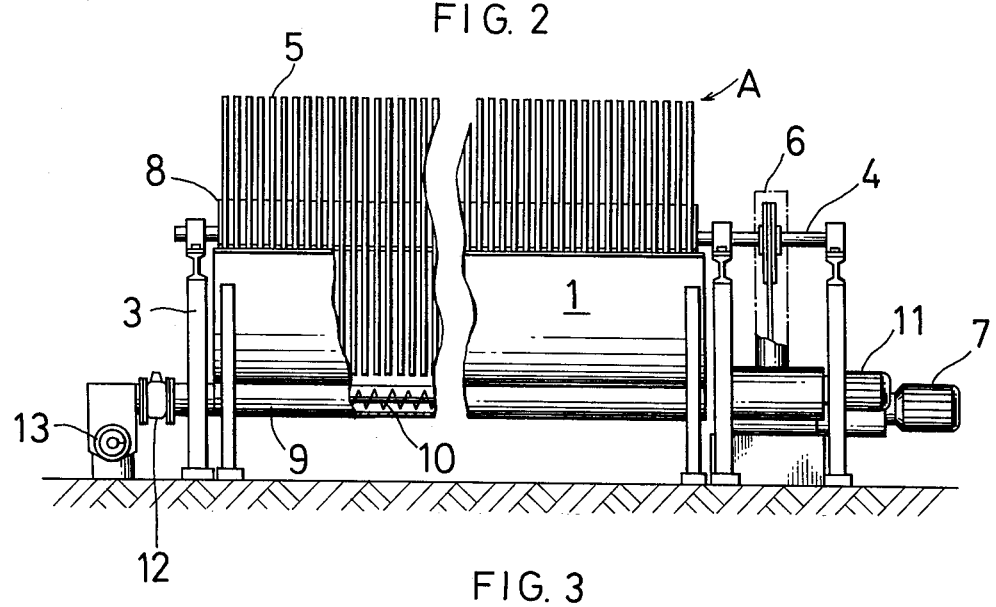
FIG. 2 is a side elevational view partially broken away to show underlying parts, of the form shown in FIG. 1.
Figure 3:
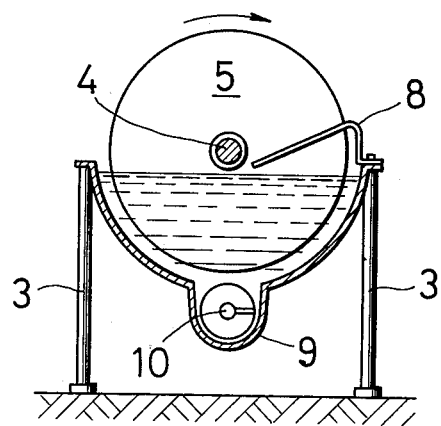
FIG. 3 is a sectional view taken on line 3—3 of FIG. 1.

Reference is made first to FIGS. 1-3.

One form of the drying apparatus A comprises an elongated generally semi-cylindrical vessel 1 installed with its longitudinal axis extending horizontally and its upper side open, and having an inlet pipe 2 for receiving waste liquid or slurry. A shaft 4 is rotatably mounted by frames 3 and it extends substantially coaxially of the vessel 1, i.e., closely above the open upper side thereof. A number of discs 5, preferably made of steel or other metal, are fixed to the shaft 4 at regular intervals along its entire length. The shaft 4 is rotated by a reduction gear and transmission mechanism 6 driven by an electric motor 7. As the discs 5 rotate, the lower portion of each disc passes through the slurry in the vessel 1, and a portion of the slurry sticks or adheres to the surfaces of discs 5, and the slurry dries while exposed to the air as it is carried upwardly by the rotating discs.

A comb-like scraper 8, best shown in FIG. 3, is secured to one edge of vessel 1 and has fingers or teeth which extend between adjacent pairs of discs 5. The fingers extend closely adjacent the sides of the discs and slide against them, and they scrape off excessive amounts of the slurry solids on the discs, preferably shortly before the scraped slurry solids would return to the liquid slurry within the vessel 1. The fingers of the scraper 8 are angled downward relative to the radius of the discs 5 so that the solids drop into the vessel.

The vessel 1 is formed with a generally semi-cylindrical groove or trough 9 along the inside and at the bottom thereof, within which a spiral screw or propeller 10 extends. The propeller 10 is connected at one end thereof to a motor 11 having a reduction gear. When the motor is turned on, a portion of the concentrated slurry solids are forced out at the other end and pushed through an outlet valve 12 and into a conveyer 13. The propeller 10 may also be reversely driven to move the slurry away from the outlet valve so that the slurry is stirred for a more even distribution thereof within the vessel during the dehydration process.

The operation may be automatically controlled, for example, by a control system (not shown) that senses the driving torque on the shaft 4, which torque will increase with the viscosity of the slurry, to determine how dry the slurry is. The sensed value may be used to open the valve 12 and to turn on the drive motor 11 for the propeller 10 for discharging the slurry. The control may further detect the driving torque on the propeller 10, which will decrease when the slurry has been discharged or removed, so as to close the outlet valve 12 and open an inlet valve 19 in the inlet pipe 2 for again filling the vessel 1 with a predetermined amount of slurry.

Figure 4:
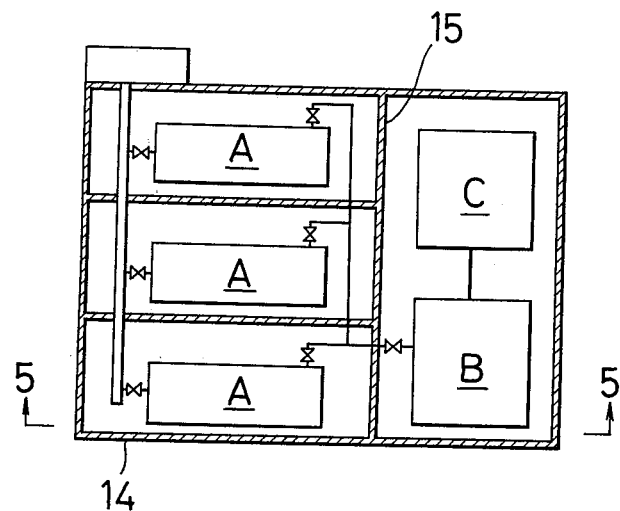
FIG. 4 is a diagramatic plan view of a plant including apparatus in accordance with this invention.
Figure 5:
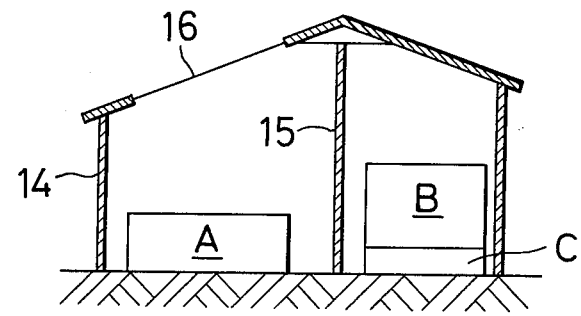
FIG. 5 is a sectional view taken on line 5—5 of FIG. 4.

As shown in FIG. 4, a plant for disposing of the waste liquid or slurry may include a plurality of the described drying apparatus A, a pre-dehydration unit B, such as a centrifuge, connected to supply dehydrated slurry thereto, and a settling tank C connected to the unit B for concentrating the waste liquid. The plant may be placed in a housing 14 with each apparatus A separated from the others by a partition 15. As shown in FIG. 5, the drying rooms may, similar to a hothouse or greenhouse, have a transparent roof 16 made of plastic, glass or the like, through which solar rays can pass, in order to heat the drying apparatus A. The slurry flows through pipes from the settling tank C, to the unit B, and then to the apparatus A. Additional pipes remove the concentrated waste solids from the vessels 1.

Figure 6:
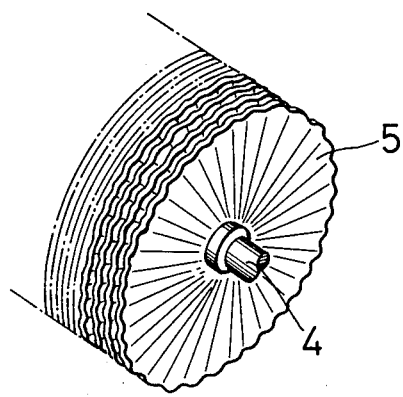
FIG. 6 is a perspective of a modified form of rotary disc of the apparatus.

The drying apparatus may also include means for blowing air past the discs 5, with or without a heater through which the air is passed and/or a heater on or in each vessel 1, to accelerate the drying process. The side surfaces of each disc 5 may be flat, rough or waved in the circumferential direction, as shown in FIG. 6, to increase the surface area for drying the slurry. Otherwise, the disc 5 may be made of a perforated metal or made with a mesh material.

Figure 7:
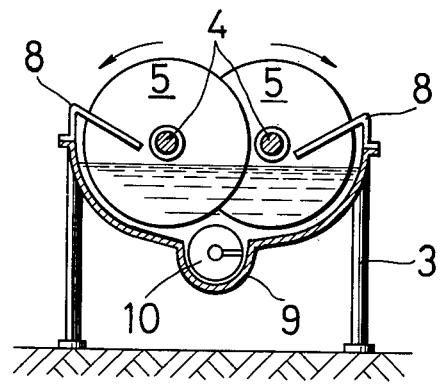
FIG. 7 is a view similar to FIG. 3 but showing another form of the invention.

FIG. 7 shows a modified form of the apparatus wherein two rows of discs 5 are provided, a portion of each disc in one row being interposed between two of the discs in the other row in order to increase the surface area for drying the slurry.

EXAMPLE

A vessel (1) constructed as shown in FIGS. 1-3 and having an inner size in plan view of 1,540 mm × 7,800 mm was installed in a housing as shown in FIG. 5 and provided with flat steel discs (5) having a thickness of 2.3 mm and a diameter of 1,500 mm and spaced 16-18 mm from each other on a driving shaft (4) having a diameter of 200 mm. The vessel was filled with 2.2 m³ of sewage containing 90% by weight of water so that a lower portion, 650 mm deep on each disc, is immersed in the sewage. The discs were rotated at a speed of 1/360 rpm while the housing was maintained at an average temperature of 10°-15° C. and an average humidity of 40-50%. The major portion of the sewage slurry sticking to the surfaces of the discs was scraped off leaving an average thickness of about 1.0 mm thereon shortly before the slurry returned to the liquid sewage within the vessel. In 72 hours, the water content of the sewage was reduced to 50% by weight.

What is claimed is:

1. Apparatus for dehydrating a liquid containing solids by evaporating a portion of the liquid, comprising a vessel open at the upper side, inlet pipe means connected to the vessel and adapted to receive the liquid and to flow the liquid into the vessel, at least one rotatable shaft extending substantially horizontally over said open side, a row of spaced discs mounted on said shaft and rotatable therewith, such that the lower portions of said discs extend into and pass through the liquid and a portion of the liquid and solids adhere to the discs, means operatively connected to said discs for relatively slowly rotating the discs at a speed slow enough to permit substantially all of the liquid to evaporate from the discs, and outlet means connected to the lower side of said vessel for removing concentrated liquids and solids from said vessel, said inlet pipe means and said outlet means comprising the only liquid flow connections to said vessel.

2. An apparatus as in claim 1, wherein said discs have flat surfaces.

3. An apparatus as in claim 1, wherein said discs have surfaces waved in the circumferential direction thereof.

4. An apparatus as in any one of claims 1-3, and further comprising means for scraping slurry solids sticking to the surfaces of said discs.

5. An apparatus as in claim 1, wherein said outlet means comprises at least one rotatable spiral propeller mounted within and extending along the bottom of said vessel and removing said concentrated liquid and solids.

6. An apparatus as in claim 1, and further including a second shaft and a second row of disks thereon, said shafts and discs being arranged so that a portion of each disc in one of the rows is interposed between two of the discs in the other row.

7. An apparatus as in claim 1, wherein said vessel has a trough formed at said lower side thereof, and said outlet means is located in said trough.

8. An apparatus as in claim 4, wherein said scraping means is shaped to return the scraped solids to said vessel.

9. A method of dehydrating a liquid containing solids utilizing a vessel open at the upper side and adapted to receive the liquid, at least one rotatable shaft extending substantially horizontally over said open side, and a row of spaced discs mounted on said shaft and rotatable therewith, said method comprising the steps of flowing a quantity of the liquid and the solids into the vessel to cover the lower portions of the discs, slowly rotating the discs to carry a portion of the liquid and the solids upwardly and expose them to air above the liquid, continuing to rotate the discs at a rate slow enough to permit substantially all of the liquid to evaporate from the discs and thereby concentrate the solids, removing the concentrated solids from the discs, periodically removing the concentrated solids from the lower side of the vessel, and periodically flowing an additional quantity of said liquid and solids into said vessel after the concentrated solids have been removed.

10. A method as in claim 9, and further including the step of removing the concentrated solids from the discs by scraping the sides of said discs just before the concentrated solids reenter the liquid due to said continued rotation of the discs.

* * * * *